(12) United States Patent
Fukushima et al.

(10) Patent No.: US 7,636,514 B2
(45) Date of Patent: Dec. 22, 2009

(54) IMAGE PICK-UP DEVICE INCLUDING RECORDING AND REPRODUCING CAPABILITIES

(75) Inventors: Takashi Fukushima, Tokyo (JP); Kissei Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 11/016,356

(22) Filed: Dec. 17, 2004

(65) Prior Publication Data

US 2005/0157177 A1    Jul. 21, 2005

(30) Foreign Application Priority Data

Dec. 22, 2003    (JP) .............................. 2003-425359

(51) Int. Cl.
*H04N 5/232* (2006.01)
(52) U.S. Cl. .................................... 386/107; 348/231.4
(58) Field of Classification Search ................ 386/107; 348/231.4, 231.5, 241
See application file for complete search history.

(56) References Cited

U.S. PATENT DOCUMENTS

2002/0057351 A1    5/2002  Suzuki et al.
2004/0001708 A1 *  1/2004  Hatori ........................ 396/310

FOREIGN PATENT DOCUMENTS

| JP | 62-210799 | | 9/1987 |
|---|---|---|---|
| JP | 401146471 A | * | 6/1989 |
| JP | 07-177404 | | 7/1995 |
| JP | 07-240864 | | 9/1995 |
| JP | 08-009317 | | 1/1996 |
| JP | 09-331502 | | 12/1997 |
| JP | 411231399 A | * | 8/1999 |
| JP | 2000-02074 | | 1/2000 |

OTHER PUBLICATIONS

Suga, Translation of Japanese Patent Document #01146471, 1989.*

* cited by examiner

*Primary Examiner*—David E Harvey
(74) *Attorney, Agent, or Firm*—Wolf, Greenfield & Sacks, P.C.

(57) ABSTRACT

An electronic device including an image pick-up element and an image pick-up device including a recording and reproducing element are provided in which shutter sound is muted or decreased, so that the artificial electronic shutter sound is not mixed with audio signals when recording is performed and the shutter sound may not be reproduced at the time of reproduction. The shutter sound generated by the electric artificial shutter sound data unit and the shutter sound of the reverse phase stored in advance in the sound effect data unit are mixed to cancel each other after the occurrence of the electric shutter sound, and in the canceled state audio signals are recorded.

3 Claims, 8 Drawing Sheets

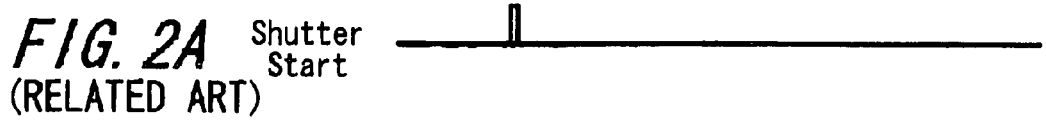
FIG. 2A Shutter Start
(RELATED ART)
FIG. 2B Shutter Sound
(RELATED ART)
FIG. 2C Amp Gain
(RELATED ART)
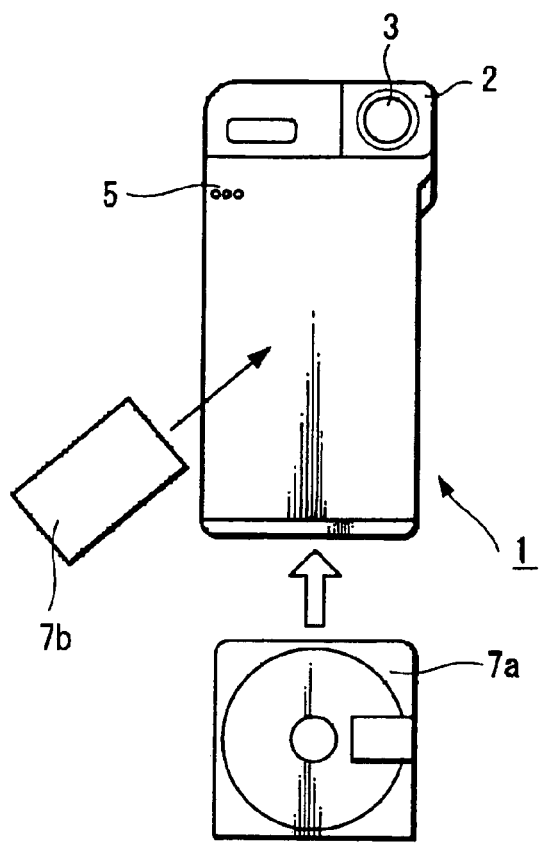
FIG. 4A
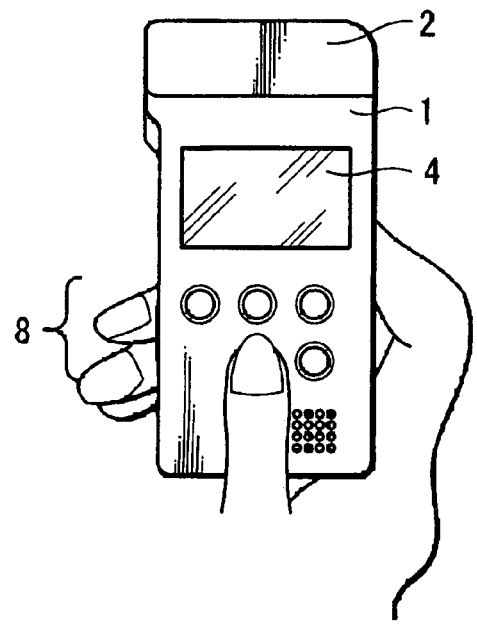
FIG. 4B

IMAGE PICK-UP DEVICE INCLUDING RECORDING AND REPRODUCING CAPABILITIES

BACKGROUND OF THE INVENTION

1. Field of the Invention

The present invention relates to an electronic apparatus including a camera or other image pick-up means in a portable recording and reproducing apparatus and an image pick-up apparatus including a recording and reproducing means that has a recording and reproducing function in a digital camera or the like. Particularly, the present invention relates to an electronic apparatus including an image pick-up means and an image pick-up apparatus including a recording and reproducing means, in which a shutter sound added to image pick-up means is muted when recording is performed.

2. Description of the Related Art

A data input apparatus of an electric camera that is disclosed in Patent literature 1 has conventionally been known, in which an image picked up by a camera using a film or by an electronic camera of a digital type which photographs a subject using CCD and the like is reproduced from a memory and is displayed on a display means such as LCD and the like, and not only an image but also sound is recorded.

FIG. 1 shows a flow chart of the data input apparatus disclosed in patent literature 1, and in the above-mentioned electronic camera the shutter sound is electrically generated similarly to a conventional camera using film, so that a user can recognize by the recorded shutter sound that an image of a predetermined subject was picked up and the picture thereof was recorded.

FIG. 1 shows an operation flow of such an electronic camera in which when a release switch is operated and photographing of a predetermined subject is indicated, an output of the recorded shutter sound is not performed.

In FIG. 1, whether a control switch or a touch plate has been operated is judged by a CPU in step S1. When it is judged that the control switch or the touch panel has not been operated, operation is returned to the step S1, and the processing of the step S1 is repeated. On the other hand, when it is judged that the control switch or the touch plate has been operated, operation proceeds to step S2, and it is judged whether a release switch has been pushed.

When it is judged that the release switch was pushed in the step S2, operation proceeds to step S3, and it is judged whether sound is being recorded at present. When it is judged that the sound is being recorded at present, operation proceeds to step S4; the recoded shutter sound is muted (not to output); and a light-emitting diode provided in an eye-piece of the finder is switched on and illuminated to make a user visually confirm that the operation in which an image of a subject is recorded in a memory card is started.

On the contrary, when it is judged that the sound is not being recorded, operation proceeds to step S6, and the recoded shutter sound is output to make a user acoustically recognize that pick-up of an image of a subject was started.

Next, operation proceeds to step S5, and a picked-up image is recorded in a memory card. After that, operation is returned to the step S1 and the processing started from the step S1 is carried out repeatedly.

Further, in the step S2, when it is judged that the control switch and the touch plate other than the release switch were operated, operation proceeds to step S7 where it is judged whether sound is being recorded at present, and if it is judged that the sound is being recorded, the sound effect corresponding to the operation is not output; on the other hand, if it is judged that the sound is not being recorded, operation proceeds to step S8 and after the predetermined sound effect corresponding to the operation is output, the processing corresponding to the operation is carried out as step S9.

As mentioned above, an input data apparatus is disclosed, in which when the sound is being recorded, the output of the recorded shutter sound and the other sound effect are not performed, so that the recorded shutter sound and the sound effect might not be recorded in a memory card along with the recording sound.

Further, an apparatus in which a video camcorder and a film camera are integrally formed to perform image pick-up by the video camcorder and to perform photographing by the film camera at the same time is proposed. In such an apparatus, when using a film camera, the shutter sound and the operational sound of winding and rewinding of a film are not considered to be problems; however, since the video camera is integrally provided and the above-described sound is directly input into a microphone on the video side, the sound quality when taking the video is deteriorated.

In patent literature 2, an image and audio recording apparatus is disclosed, in which in order to prevent the above-mentioned problems, the operational sound is not recorded even if a film camera is used during the video photographing.

In the image and audio recording apparatus of the above-mentioned patent literature 2, as a method for decreasing or deleting the operational sound of the recording means, referring to the timing chart of FIG. 2, a gain of an amplifier is set at the normal level during the normal video photographing and the normal recording is performed. Hereupon, a method in which when the shutter on the film camera side is pushed as shown in FIG. 2A and the shutter-sound is generated as shown in FIG. 2B, a control circuit detects a shutter start signal and a gain of an amplifier is lowered (or is made to be zero) only in a period of the shutter sound occurring as shown in FIG. 2C; a method of detecting the start signal and selecting a filter that decreases the shutter sound only in a period of the shutter sound occurring; and an image and audio recording apparatus in which a coefficient variable filter is arranged in an audio circuit and a coefficient of the filter is changed in accordance with a coefficient supplied from a coefficient data generation circuit so that the recording sound occurring on the film camera side is removed or decreased, are disclosed.

By removing the recorded shutter sound as shown in the above-mentioned patent literature 1 and patent literature 2, sound can be listened to comfortably when reproduction is performed; however, in the method in which a gain of an amplifier is made to lower only during a period of the shutter sound recording, a problem of also lowering a gain of the recording signal normally recorded occurs and a circuit becomes complicated when a filter is used, which is also a problem.

Patent literature 1: Japanese Published Patent Application H9-331502

Patent literature 2: Japanese Published Patent Application H8-9317

SUMMERY OF THE INVENTION

The present invention is made to solve the above-mentioned problems and aims to obtain an electronic apparatus including a recording and reproducing means and an image pick-up apparatus including a recording and reproducing means, in which the recording shutter sound in the shutter operating period is removed or decreased easily using the shutter sound which is recorded in advance as the shutter sound in the period of the shutter sound, and the recording in the period of the shutter sound is performed by using another sound effect, so that reproduction can be performed without uncomfortable sensation with the audio signal recording other than an unpleasant sound such as the shutter sound.

The present invention is an electronic apparatus including an image pick-up means, including a recording and reproducing means which records and reproduces an audio signal obtained from a microphone, in which when the shutter operation of an image pick-up means is performed while the recording and reproducing means operates, shutter sound data and shutter sound data of a reverse phase are output to cancel each other and the shutter sound is not made to output.

The present invention is an image pick-up apparatus including a recording and reproducing means, in which when the shutter operation of an image pick-up means is performed while the recording and reproducing means to record and reproduce an audio signal obtained from a microphone operates, shutter sound data and shutter sound data of a reverse phase are output to cancel each other and the shutter sound is not made to output.

The present invention is an electronic apparatus including an image pick-up means, which includes a recording and reproducing means which records and reproduces an audio signal obtained from a microphone, in which when the shutter operation of an image pick-up means is performed while the recording and reproducing means operates, sound effect data is output instead of the output of shutter sound data.

The present invention is an image pick-up apparatus including a recording and reproducing means, in which when the shutter operation of an image pick-up means is performed while the recording and reproducing means to record and reproduce an audio signal obtained from a microphone operates, sound effect data is output instead of the output of shutter sound data.

According to the electronic apparatus including an image pick-up means and the image pick-up apparatus including a recording and reproducing means of the present invention, the configuration in which shutter sound is not recorded can be obtained easily only by performing a phase reverse operation.

Further, since sound effect is output as the shutter sound instead of electronic shutter sound, audio signals can be listened to comfortably when reproduction is performed.

For example, an electronic apparatus such as a mobile phone unit with a camera, a portable recording and reproducing apparatus with a camera, a PDA (personal data assistant) with a camera, including a sound recording function and an image pick-up function in media such as a mini-disk (MD), a flash memory, and a HDD can be applied as an electronic apparatus including an image pick-up means of the present invention. Further, a digital still camera with a sound recording function, a camcorder with a sound recording function and a HDD camcorder with a sound recording function and so on can be applied to an image pick-up apparatus including a recording and reproducing function of the present invention.

BRIEF DESCRIPTION OF THE DRAWINGS

FIGS. 2A to 2C are diagrams for explaining waveforms when a conventional gain control of the shutter sound is performed;

FIGS. 4A and 4B are a front view and a rear view of a digital camera with a recording function, which shows an embodiment of the present invention;

DESCRIPTION OF PREFERRED EMBODIMENTS

Figure 1:
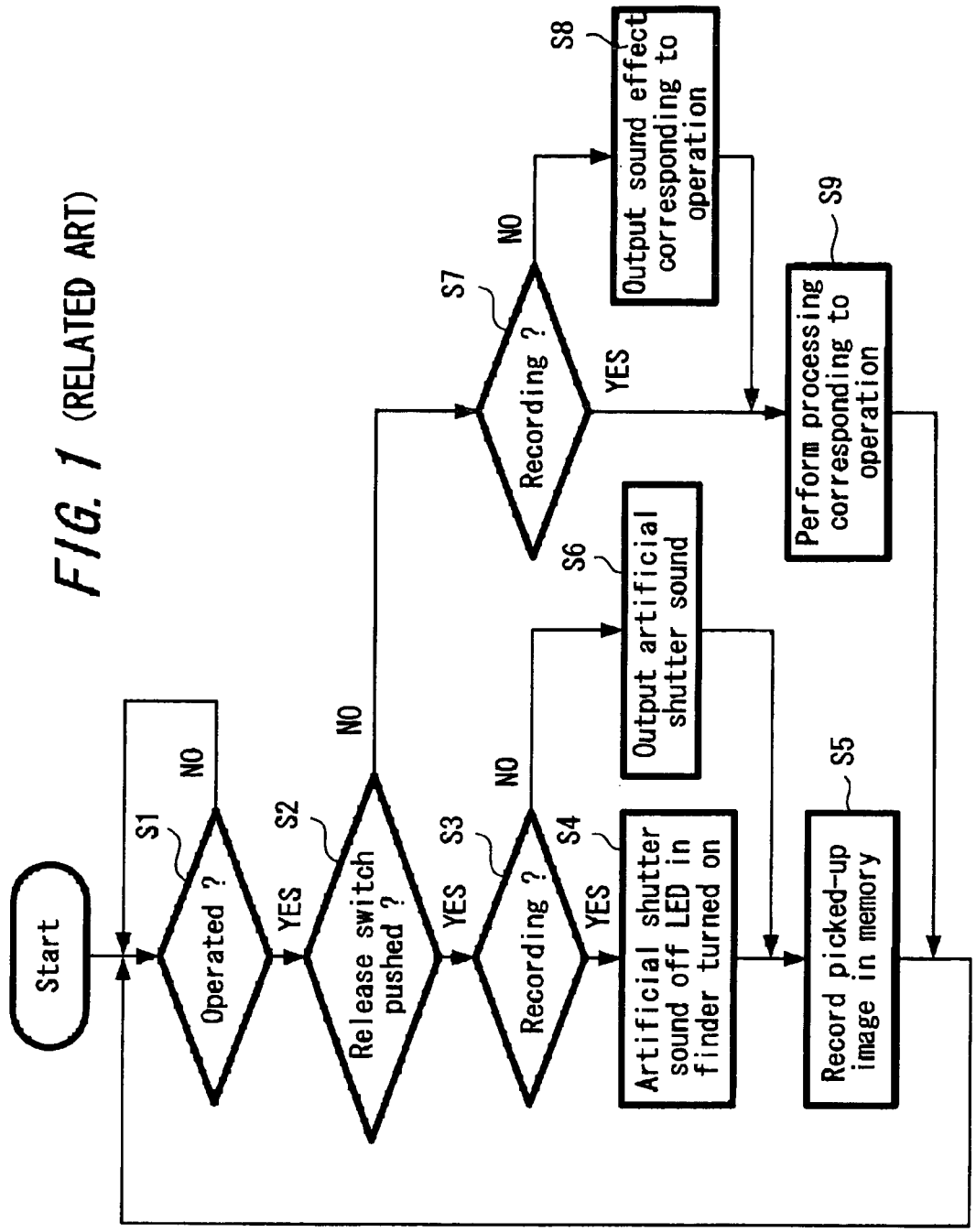
FIG. 1 is a flow chart for explaining a conventional operation not to output shutter sound during recording.
Figure 3:
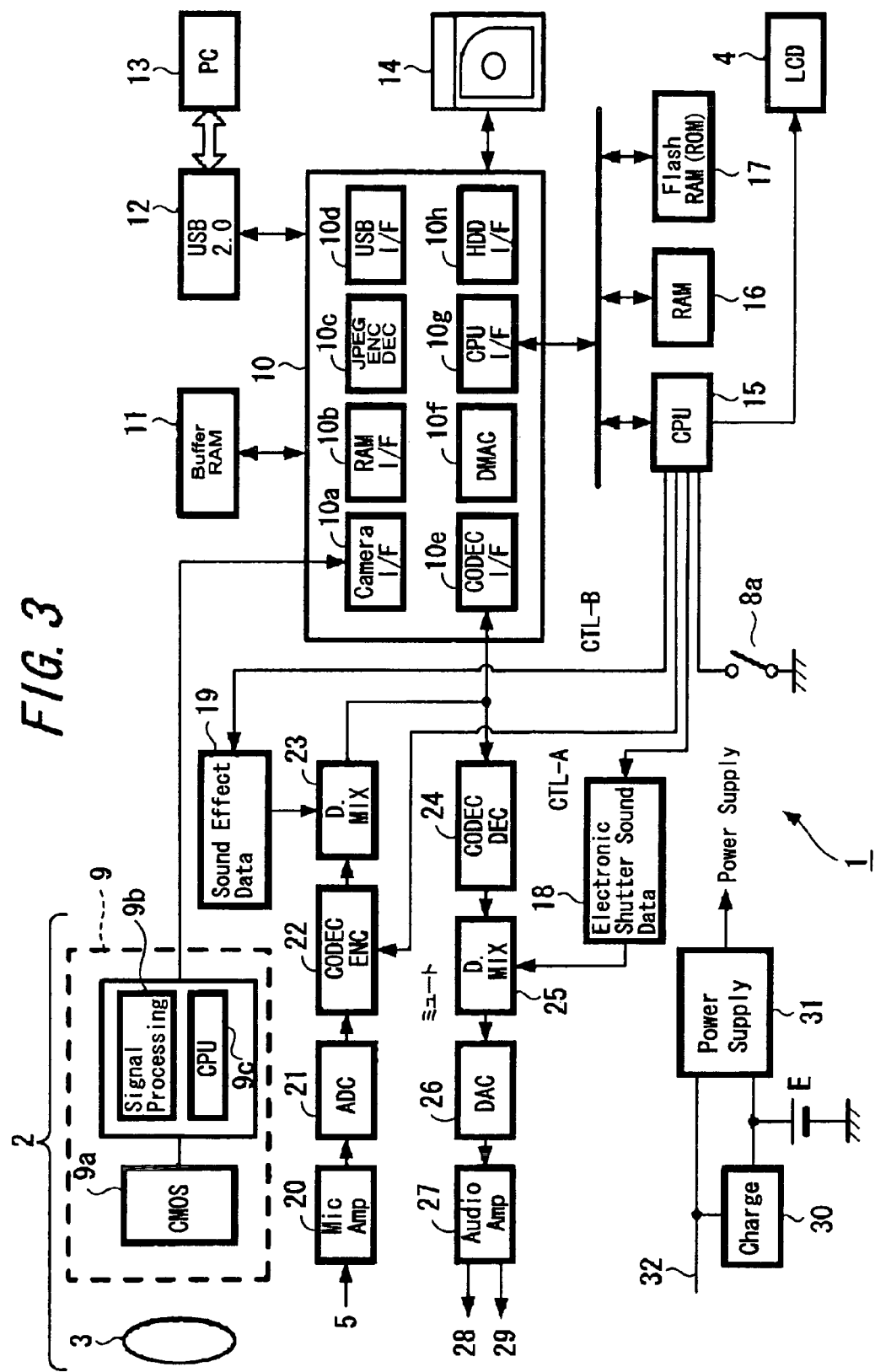
FIG. 3 is a block diagram of a digital camera with a recording function, which shows an embodiment of the present invention.
Figure 5:
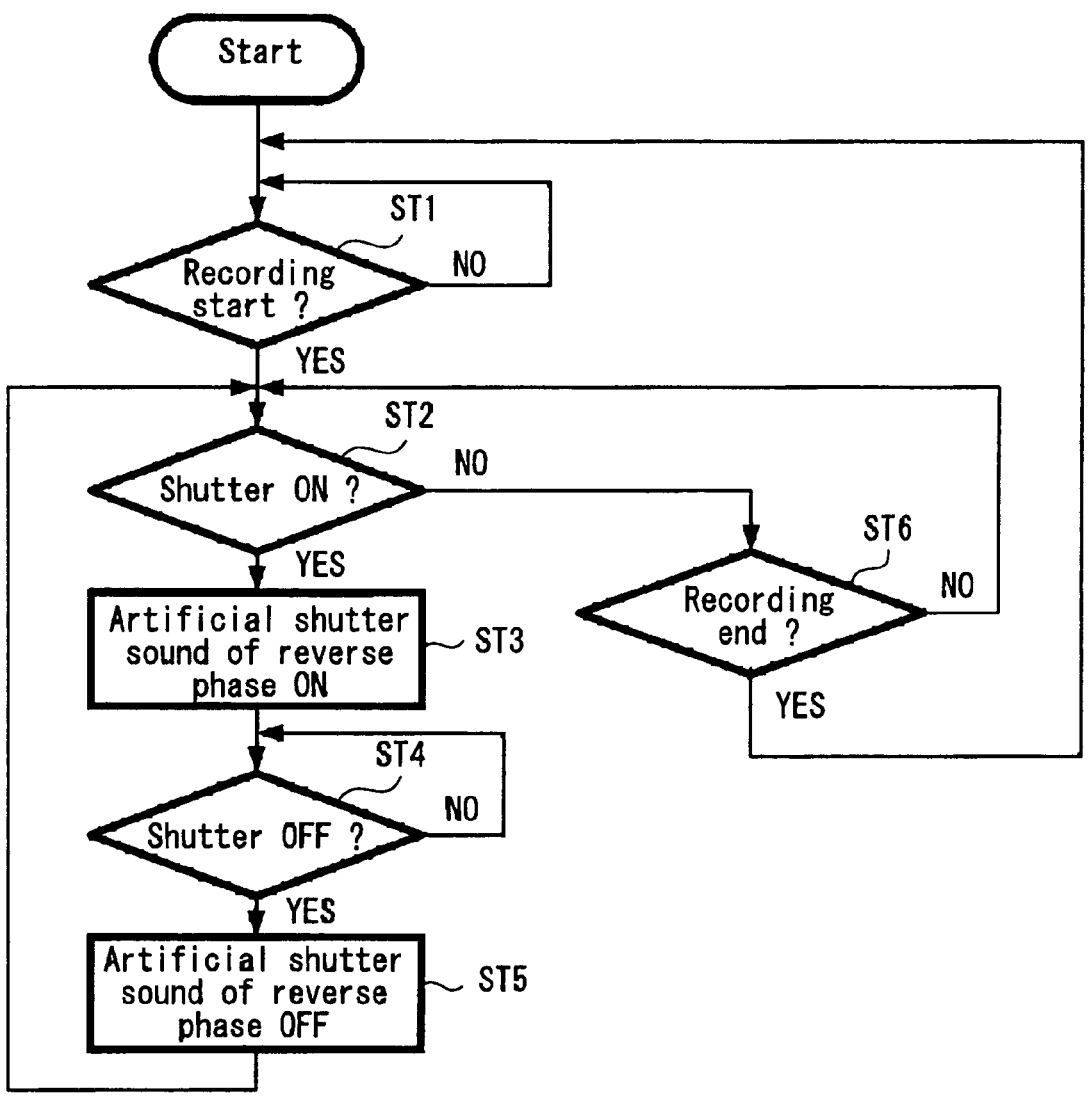
FIG. 5 is an operation flow chart to cancel the shutter sound according to the present invention.
Figure 6:
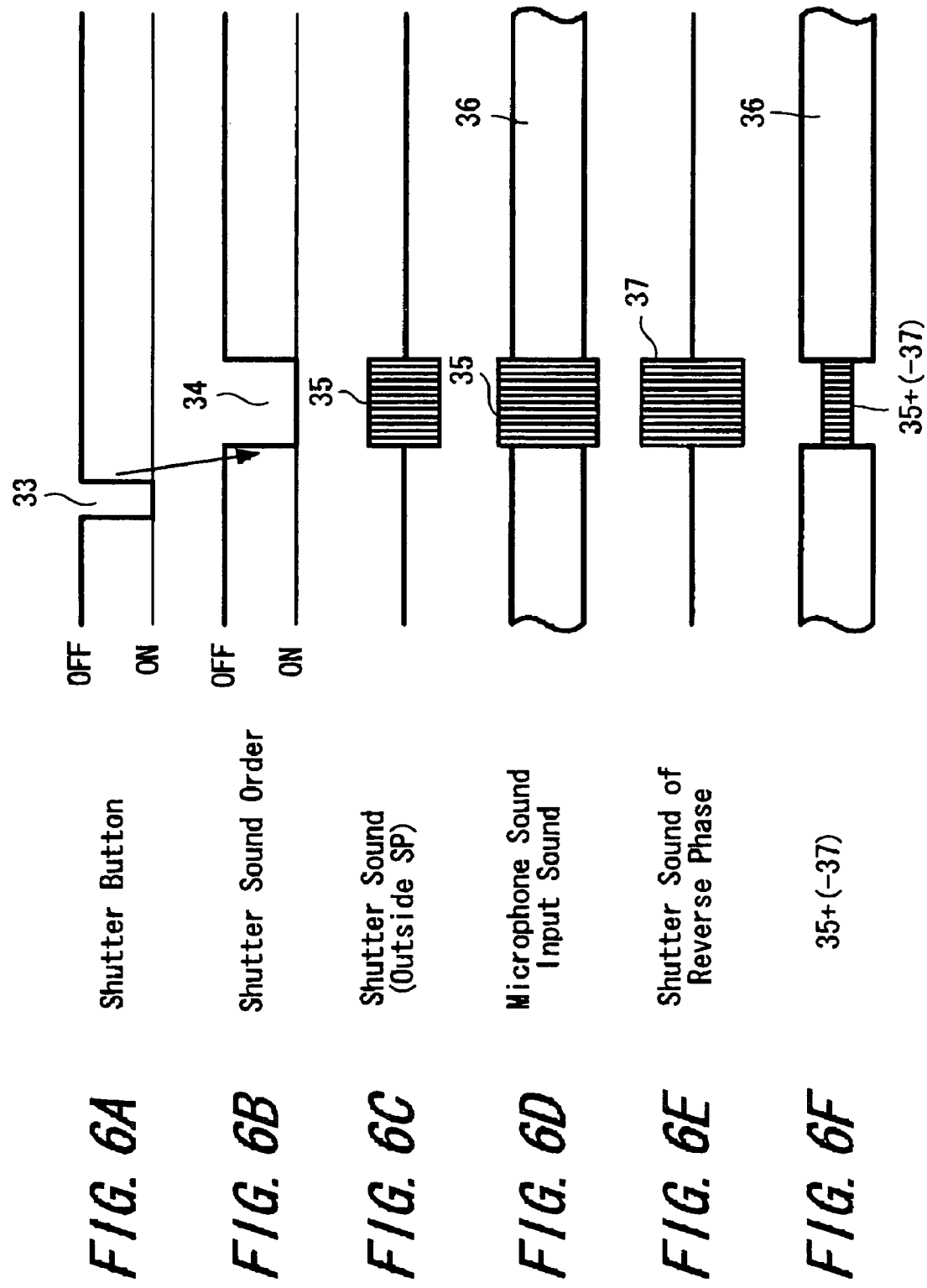
FIGS. 6A to 6F are timing charts for explaining operation to cancel the shutter sound according to the present invention.

Hereinafter, an embodiment of the present invention is explained in detail referring to FIGS. 3 through 6. FIG. 3 is a block diagram of a digital camera with a recording function which shows an embodiment of the present invention; FIGS. 4A and 4B are outer appearance views of a digital camera which shows an embodiment of the present invention; FIG. 5 is a flow chart which shows a method of canceling the shutter sound when recording is performed, which is an embodiment of the present invention; and FIGS. 6A through 6F are timing charts which show an operation of a method of canceling the shutter sound when recording is performed, which is an embodiment of the present invention.

Before the explanation of the block diagram of FIG. 3, a general configuration about a digital camera which can record an audio signal in a HDD is explained referring to FIG. 4, as an image pick-up apparatus including a recording and reproducing means of the present invention.

In FIGS. 4A and 4B, FIG. 4A shows a front view of a digital camera and FIG. 4B shows a rear view thereof, and a lens 3 constituting a camera unit 2 is provided on the upper surface portion of a camera body 1 formed of approximately a rect-angle-shaped casing, as shown in FIG. 4A. A microphone 5 and a recording medium 7a such as a HDD or the like in which an image data and an audio signal of a recording medium 7b such as a MD which can record and reproduce an audio signal can be recorded and reproduced, are incorporated or detachably installed in the casing of the camera body 1.

As shown in FIG. 4B, a display device 4 constituting a monitor and finder of such as LCD and the like and an operation button group 8 such as a shutter and the like are arranged on the rear surface of the camera body 1, and the digital camera is small-sized and light-weight so that it is convenient for a portable use.

The circuit configuration of the above-mentioned camera body 1 is explained in a block diagram of FIG. 3. In FIG. 3, the camera unit 2 includes the lens 3 and a camera module 9 and a signal processing unit 9b and the like formed of an optical sensor 9a of such as a COMOS type, a CCD type and a CPU 9c is included within the camera module 9.

An output of the camera module 9 is supplied to a camera I/F 10a in a system LSI 10. A RAM I/F 10b, a JPEG encoder and decoder 10c, a USB I/F 10d, a codec I/F 10e, a CPU I/F 10g, an HDD I/F 10J and a DMAC (direct memory access controller) 10f are incorporated in the system LSI 10, and the RAM I/F 10b is connected to a buffer RAM 11, and the USB I/F 10d is connected to a personal computer 13 through a USB (2.0) 12, and the HDD I/F 10J is connected to a HDD 14.

Furthermore, the CPU I/F 10g in the system LSI 10 is connected to a computer (CPU) 15 constituting a control circuit through the bus. Here, numerals 16 and 17 denote a RAM and a ROM (flash RAM) for the work use, respectively and the CPU 15 is connected to the display device 4, and image and various data are displayed.

Further, the CPU 15 is connected to a shutter button 8a and controls an electronic shutter sound data unit 18 in which electronic shutter sound data are stored in advance, a sound effect data unit 19 in which the sound effect data is stored, and a codec encoder 22.

In the input and output path constituting a recording and reproducing device, after an audio signal input from a microphone 5 is amplified through a micro-amplifier 20, the signal is converted into digital data through an analogue-digital converter (ADC) 21, and is supplied to a digital mixer 23 after encoded by the codec 22. In the digital mixer 23, a predetermined, for example, PB effective sound is mixed. The digital mixer 23 is connected to the codec I/F 10e in the system LSI 10.

Furthermore, in the output system of the audio signal, the audio data decoded in the codec decoder 24 is supplied to a digital mixer 25. An artificial electronic shutter sound data stored in advance in the electric shutter sound data unit 18 is mixed in the digital mixer 25. The mixed data after mixing is converted by a digital-analogue converter (DAC) 26 into an analogue audio signal, and after amplified by an audio amplifier 27 the signal is output to a headphone 28 and a speaker 29, and the sound is emitted.

In FIG. 3, numeral 30 denotes a battery charger, numeral 32 denotes a direct current input terminal, numeral 33 denotes a power supply circuit to supply a power supply voltage to each circuit and symbol E denotes a voltage source such as a battery and the like.

In the above-mentioned configuration, when the digital camera body 1 enters the recording mode, the CPU 15 makes each circuit enter the recording mode, and an audio signal input from the microphone 5 passes through the ADC 21 and is encoded by the codec encoder 22. The period in which the shutter button 8a is pressed and the electronic shutter sound is emitted can also be muted by making the codec encoder 22 have a mute function.

Further, the digital mixer 23 performs the mixing of the digital data, in which the sound effect and the artificial shutter sound of the reverse phase were recorded in advance, in the period in which the electronic shutter sound is emitted, and an audio signal is recorded in the HDD 14 through the codec I/F 10e of the system LSI.

As mentioned above, when a user has pressed the shutter button 8a to obtain an image data by the camera unit 2 while an audio signal is being recorded in the HDD 14, since the electronic shutter sound is added, the microphone 5 picks up this shutter sound to be recorded in the HDD 14.

A method of erasing the shutter sound of the present invention to remove this inconvenience is explained using a flow chart of FIG. 5 and timing charts of FIG. 6A to 6F.

FIGS. 5 and 6A to 6F show the operation in which the artificial shutter sound of the reverse phase was stored in a sound effect unit 19 in advance and the artificial shutter sound of the original phase and that of the reverse phase are added to cancel each other, so that the shutter sound in the period is removed or decreased.

In step ST1 of FIG. 5, the CPU 15 judges whether recording has been started or not. If it is "NO", the operation is returned to the beginning of the step S1, and the recording start state is monitored continuously. If it is judged that recording has been started, the operation proceeds to step ST2 and then a decision of whether the shutter button 8a has been turned on or not is made.

In the step ST2, in the "NO" state in which the shutter button 8a is not turned on, it is judged whether the recording state is ended or not in step ST6, and if it is "NO", then the operation is returned to the beginning of the step ST2 and the state in which the shutter button 8a is not turned on is monitored continuously. If it is "YES" of the recording end state, the operation is returned to the beginning of the step ST1, and the CPU 15 monitors the recording start state, and when the CPU 15 has identified the state in which the shutter 8a has been pressed in the step ST2 (refer to numeral 33 of FIG. 6A), the CPU 15 gives an order 34 to output the shutter sound of the original phase to the shutter sound data unit 18 according to the normal operation as shown in FIG. 6B.

As shown in FIG. 6C, a shutter sound 35 of the original phase is emitted through the outside speaker 29 based on the above-mentioned order. In this state, the shutter sound 35 and an audio signal 36 being recorded are superimposed on each other as shown in the timing chart of FIG. 6D.

In this state, as shown in step ST3, by controlling the sound effect data unit 19 through the line CTL-B so that the artificial shutter sound of the reverse phase becomes "ON" state, an artificial shutter sound 37, which is stored in advance in the sound effect data unit 19, of reverse phase having a 180 degree different phase from the original phase artificial shutter sound from the electronic shutter sound data unit 18, is output to cancel the artificial shutter sound of the original phase 35 to be removed or decreased; and thus the shutter sound in the period of the shutter sound can be removed as shown in FIG. 6F.

The "OFF" state of the shutter button 8a is monitored in the next step ST4 and if it becomes the "OFF" state, the artificial shutter sound of the reverse phase is made to be "OFF" as shown in step ST5 and the operation is returned to the step ST2 and the press state of the shutter button 8a is monitored.

Figure 7:
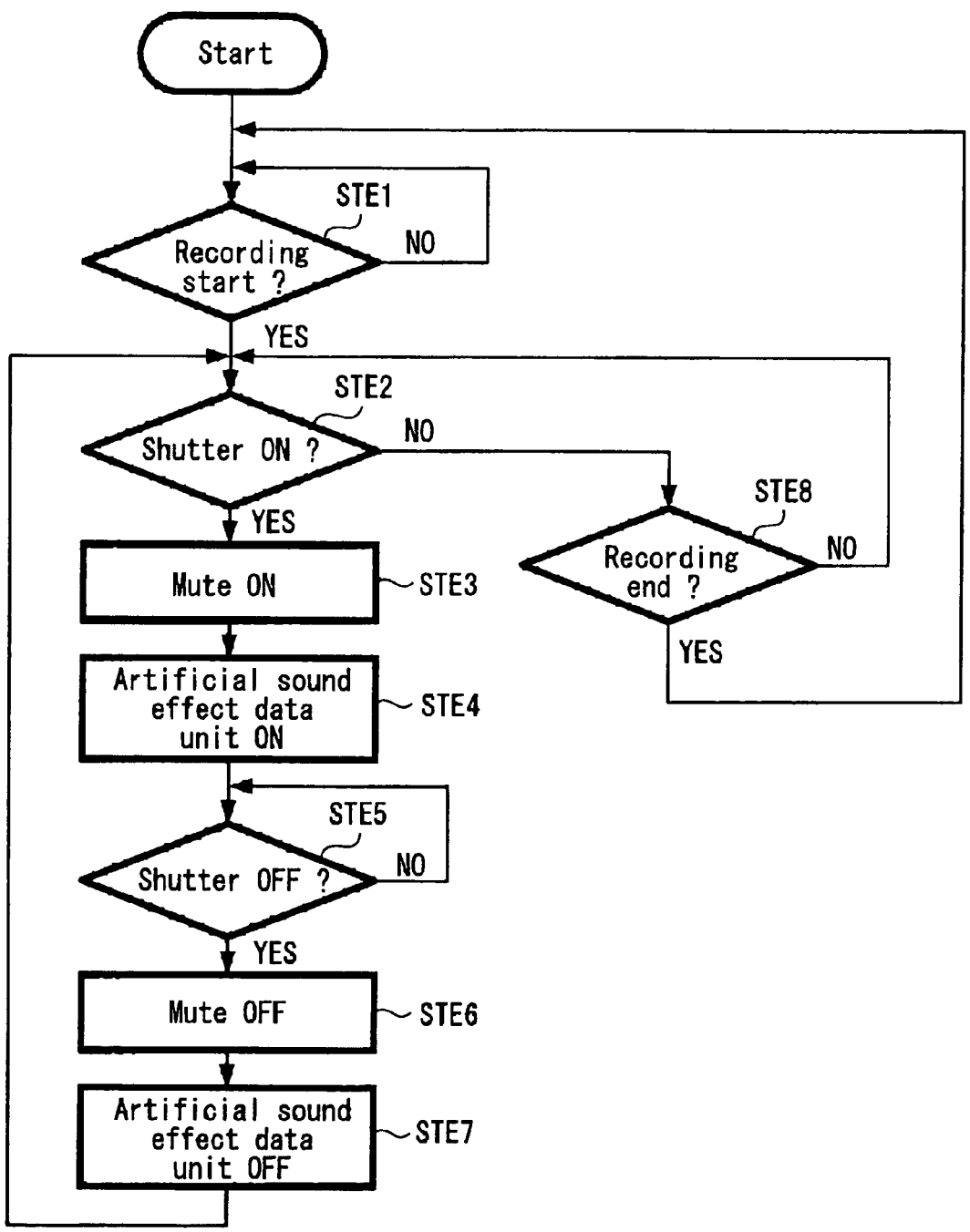
FIG. 7 is an operation flow chart to record another sound effect during the shutter sound period according to the present invention.

Next, based on FIGS. 7 and 8A to 8G a configuration, in which another sound effect is recorded in the portion where the shutter sound is removed, is explained using a flow chart FIG. 7 and timing charts of FIGS. 8A to 8G.

Figure 8:
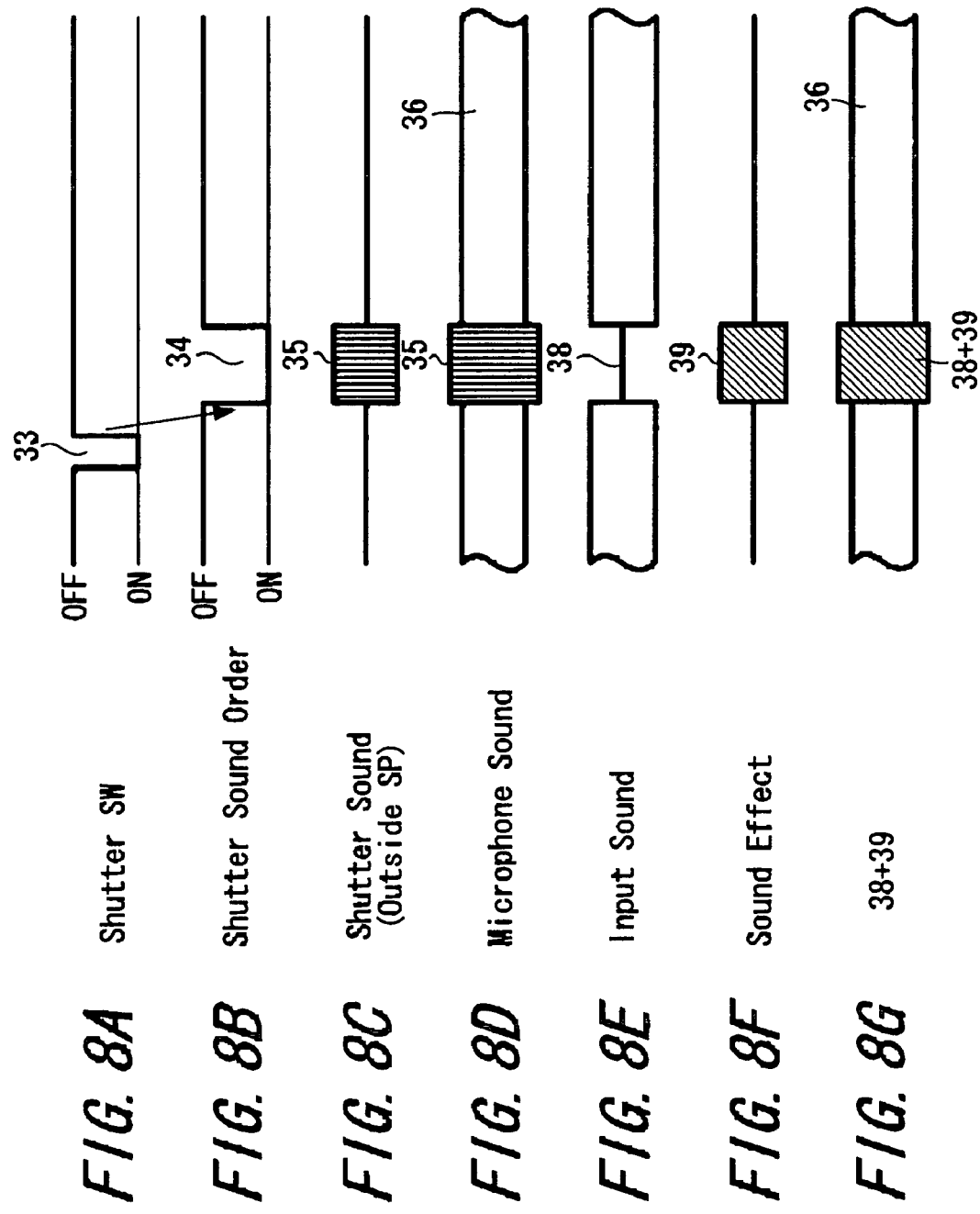
FIGS. 8A to 8G are timing charts for explaining operation to record another sound effect during the shutter sound period according to the present invention.

FIGS. 7 and 8 shows the operation in which another sound effect is inserted into the shutter sound period instead of the artificial shutter sound, so that the unpleasantness on reproducing the shutter sound recorded data can be removed and also the sound effect can be used as a collation marker with an image data when editing is performed.

In FIG. 7, the CPU 15 monitors the recording start state in step STE1, and the shutter "ON" state is judged in step STE2, and If the shutter button 8a is not the "ON" state, the operation proceeds to step STE8, and it is judged if the recording is ended, and if it is the recording end state, the operation is returned to the beginning of the STE1, and if it is not the recording end state, the operation is returned to the beginning of the STE2, and the recording start state and the shutter "ON" state are monitored.

If the shutter button 8a is turned "ON" in the step STE2 as shown in a waveform 33 of FIG. 8A, the CPU 15 gives to the electronic shutter sound data unit 18 an order to output the shutter sound as shown in the waveform 34 of the FIG. 6B. The shutter sound from the electronic shutter data unit 18 is converted to an analogue signal through the digital mixer 25 and the DAC 25, and is emitted to the speaker 29 and the like as shown in a waveform 35 of FIG. 8C.

The shutter sound 35 emitted from the speaker 29 is superimposed on a recording audio signal 36 which is input from the microphone 5 as shown in the waveform 35 of FIG. 8D.

Then, according to the present invention, the CPU 15 supplies a control signal to the encoder codec 22 through the CTL-A line as shown in the step STE3 of FIG. 7 and a mute function within the encoder codec 22 is executed as shown in a waveform 38 of FIG. 8E.

Next, as shown in STE 4 of FIG. 7, the CPU 15 controls and gives to the sound effect data unit 19 through the CTL-B line an order for generating the sound effect, so that the sound effect data unit 19 supplies a waveform 39 data of FIG. 8F to the digital mixer 23 and the sound effect is mixed with the recording audio signal 36 as shown in a waveform (38+39) of FIG. 8G.

Subsequently, the CPU 15 monitors the "OFF" state of the shutter button 8*a* as shown in step STE 5, and if the shutter button is turned "OFF", the mute is turned "OFF" in step STE6, and further the artificial sound effect data unit 19 is made to be turned "OFF" in the step STE 7, and operation is returned to the step STE 2.

Figure 9:
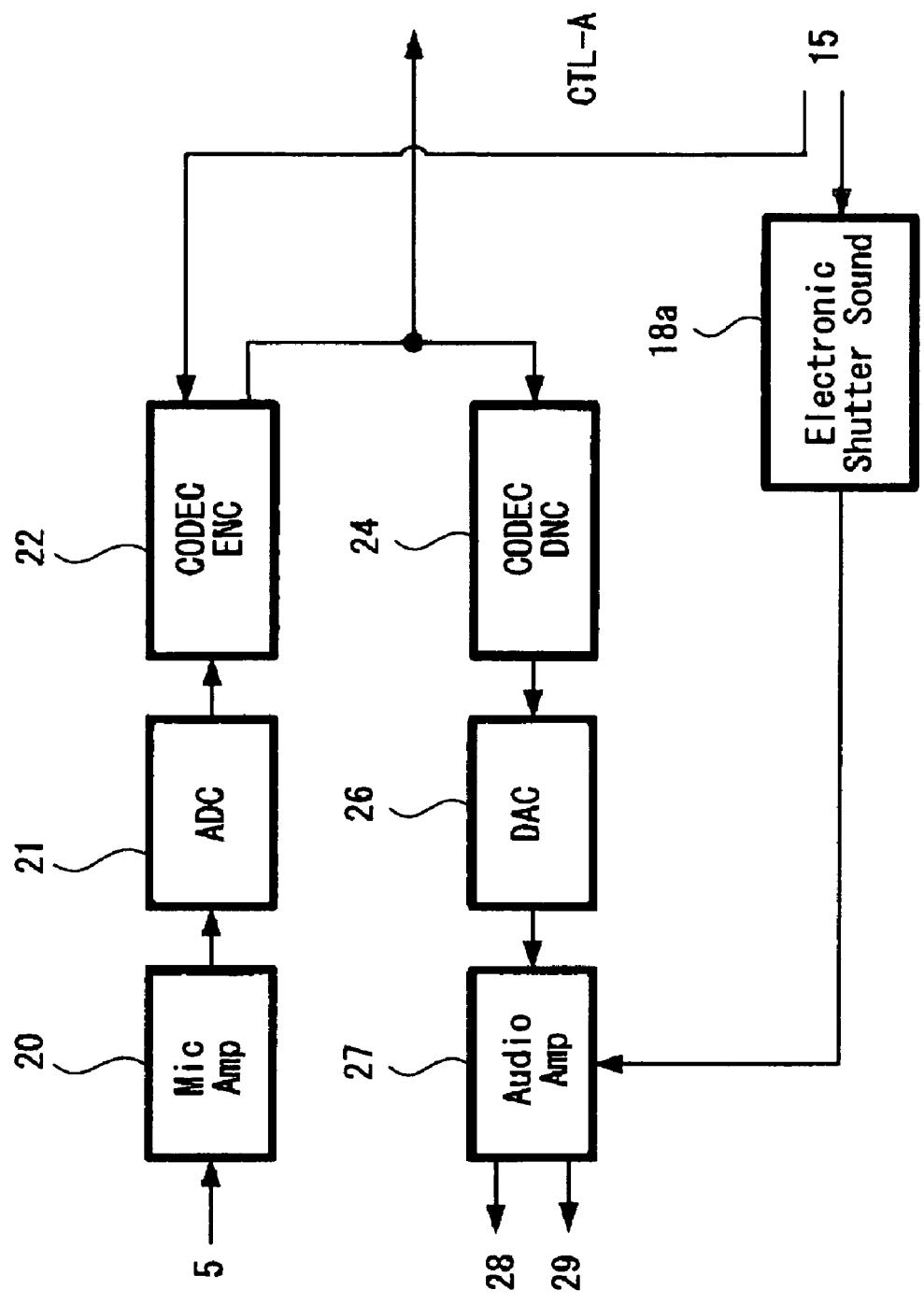
FIG. 9 is a block diagram showing another configuration of the present invention.

The configuration in which the electronic shutter sound data is supplied to the digital mixer 25 of the audio output path is explained as described above; however, an analog electronic shutter sound may be supplied to the audio amplifier to be mixed as shown in FIG. 9. Note that, in FIG. 9 the same numerals are assigned to the units corresponding to those in FIG. 3, and a redundant explanation thereof is omitted. Further, such configuration is also conceivable in which the encoding codec 22 is used not to record an audio signal in the shutter sound period. Furthermore, in the above-mentioned configuration, the electronic shutter sound was canceled by the CPU 15 using electronic shutter sound of the reverse phase recorded in advance; however, the phase reverse circuit in hardware configuration may be provided to cancel the electronic shutter sound.

According to the configuration of the present invention, since the shutter sound is not recorded, the sound can be listened to comfortably when performing reproduction. Further, the timing of the image and sound can be shifted freely based on the sound effect inserted when editing is performed. Furthermore, since the CPU 18 realizes the timing of the shutter, such inconvenience that the sound rapidly becomes small can be prevented by making feedback to the digital AGC and the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An electronic apparatus which includes image pick-up means, the apparatus comprising:

image pick-up means to pick up an image of a subject;
a microphone to record an audio signal when picking up the image;
recording and reproducing means to record and reproduce said audio signal from said microphone;
a shutter to indicate a start of image pick-up by said image pick-up means;
shutter sound generation means to generate a shutter signal when said shutter is operated;
a speaker to emit said shutter signal generated by said shutter sound generation means;
a sound effect data unit to store sound effect data and a reverse phase signal, said sound effect data and said reverse phase signal being recorded in advance, said reverse phase signal having a phase opposite to a phase of said shutter signal;
mixing means provided in the input system of said recording and reproducing means; and
control means to control at least said mixing means and said sound effect data unit,
wherein when said shutter is operated while said audio signal obtained by said microphone is recorded in said recording and reproducing means, said control means performs control to provide said reverse phase signal stored in said sound effect data unit to said mixing means to remove said shutter signal from said audio signal, so that the shutter signal is not recorded in said recording and reproducing means.

2. An electronic apparatus which includes image pick-up means, the apparatus comprising:

image pick-up means to pick up image data of a subject;
a microphone to record an audio signal when picking up the image data;
recording and reproducing means to record and reproduce said audio signal from said microphone;
a shutter to indicate a start of image data pick-up by said image pick-up means;
shutter sound generation means to generate a shutter signal when said shutter is operated;
a speaker to emit said shutter signal generated by said shutter sound generation means;
a sound effect data unit to store a sound effect signal and a reverse phase signal, said sound effect data and said reverse phase signal being recorded in advance, said sound effect signal being different than the shutter signal, and said reverse phase signal having a reverse phase relative to a phase of said shutter signal;
mixing means provided in an input system of said recording and reproducing means; and
control means to control at least said mixing means and said sound effect data unit,
wherein when said shutter is operated while said audio signal obtained by said microphone is recorded in said recording and reproducing means, said control means performs control to mute said audio signal during a time period in which said shutter signal is emitted, and wherein said sound effect signal is provided to said mixing mean, so that the shutter signal of said shutter sound generation means is not recorded in said recording and reproducing means, and so that said sound effect signal is used as a collation marker for the image data.

3. An image pick-up apparatus which includes recording and reproducing means, the apparatus comprising:

image pick-up means to pick up an image of a subject;
a microphone to record an audio signal when picking up the image;
recording and reproducing means to record and reproduce said audio signal from said microphone;
a shutter to indicate a start of image pick-up by said image pick-up means;
shutter sound generation means to generate a shutter signal when said shutter is operated;
a speaker to emit said shutter signal generated by said shutter sound generation means;
a sound effect data unit to store a sound effect signal and a reverse phase signal, said sound effect data and said reverse phase signal being recorded in advance, said sound effect signal being different than the shutter signal, and said reverse phase signal having a reverse phase relative to a phase of said shutter signal;

mixing means provided in the input system of said recording and reproducing means; and control means to control at least said mixing means and said sound effect data unit, wherein when said shutter is operated while said audio signal obtained by said microphone is recorded in said recording and reproducing means, said control means performs control to mute said audio signal during a time period in which said shutter signal is emitted, and wherein said sound effect signal is provided to said mixing means, so that the shutter signal of said shutter sound generation means is not recorded in said recording and reproducing means.

* * * * *